Oct. 10, 1944.  L. L. MALLARD  2,360,250
COMBINATION CIRCULAR ICE MOLD AND FREEING TOOL
Filed Dec. 4, 1941
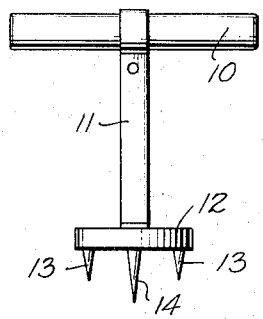
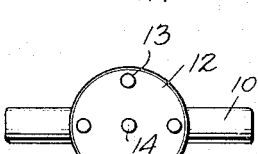
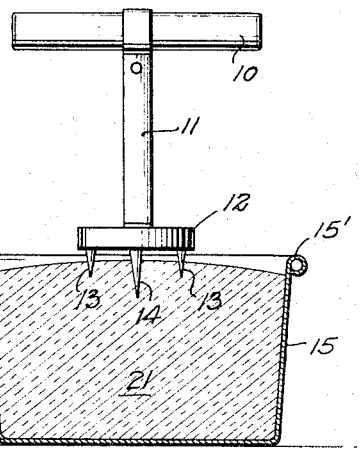
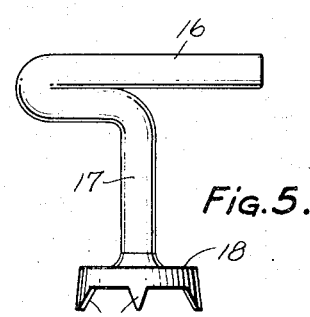
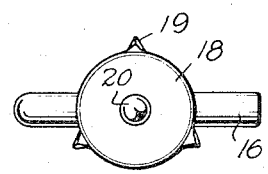
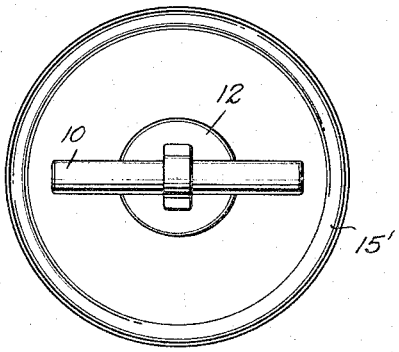
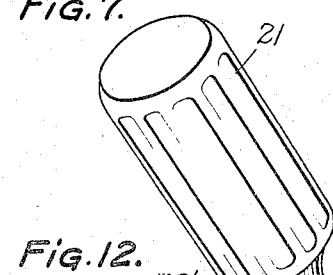
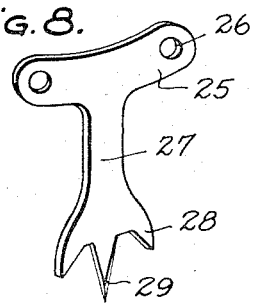
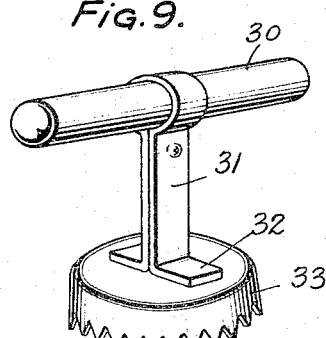
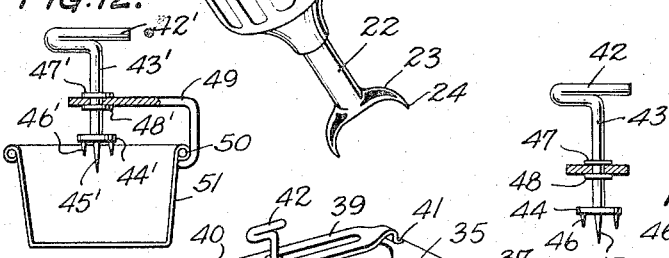
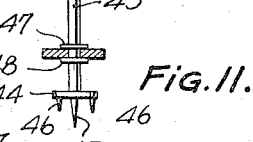
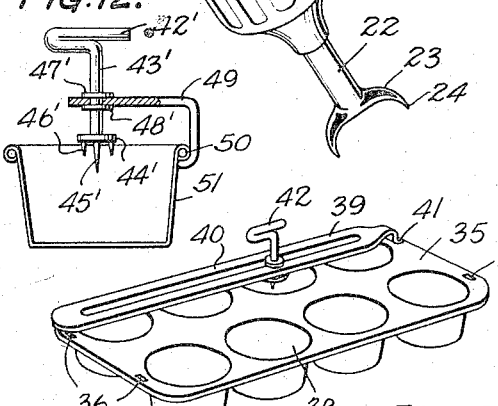
Inventor
LOGAN L. MALLARD,
By A. Yates Dowell
Attorney Patented Oct. 10, 1944

2,360,250

UNITED STATES PATENT OFFICE 2,360,250

COMBINATION CIRCULAR ICE MOLD AND FREEING TOOL

Logan L. Mallard, Norfolk, Va.

Application December 4, 1941, Serial No. 421,645

5 Claims. (Cl. 62—108.5)

This invention relates to refrigeration, and particularly to the production of ice or other congealed or frozen substances in the freezing unit of a domestic refrigerator.

The invention includes a receptacle or mold for the water or other substance to be frozen or congealed which may be either of the single or multiple cell type having a rounded mold cavity, together with means for freeing the ice block or other frozen substance from the mold cavity in the form of a simple hand tool of a particularly advantageous construction adapted to engage the ice block or mass and effect dislodgment of the same from the mold cavity.

The various objects and advantages of the invention will become apparent in view of the following description taken in conjunction with the drawing, wherein:

Figure 1 is a view in elevation of a tool in accordance with the invention;

Fig. 2 is a bottom plan view of Fig. 1;

Fig. 3 is a view in transverse vertical section of an ice mold showing the tool of Figs. 1 and 2 in engagement with the ice block to effect dislodgment and removal of the latter;

Fig. 4 is a top plan of Fig. 3;

Figs. 5 and 6 are views in elevation and bottom plan, respectively, of a modified form of tool;

Figs. 7, 8 and 9 are views in perspective of further modified types of tools in accordance with the invention;

Fig. 10 is a perspective of a multiple cell mold with an ice-removing tool unit particularly adapted for such type of mold;

Fig. 11 is a transverse section taken through the tool anchoring bar or bracket of Fig. 10; and Fig. 12 is a view in sectional elevation of a modified form of tool with respect to that shown in Figs. 10 and 11.

Referring to the drawing and first to Figs. 1, 2 and 3, the tool comprises a handle 10, a shank 11 and a gripping head 12 provided with a series of outer or peripheral ice-engaging prongs 13 and a central anchoring prong 14 which is longer than the prongs 13.

Fig. 3 illustrates the tool of Figs. 1 and 2 in the position it occupies when engaging an ice block preparatory to dislodging and removing the latter. The mold of Fig. 3 is of the individual type in contradistinction to a multiple cell or grid type of mold, and comprises a rounded or circular shell 15 having an upper beaded edge 15'. These individual molds may be used in the freezing unit of a domestic refrigerator for making ice cubes, frozen desserts and the like. As it will be noted, the molding cavity is of circular contour and tapers outwardly from the bottom thereof to the top to facilitate removal of the ice mass or block.

In using the tool, the handle 10 is grasped in the hand and may be forced into the ice block by a sudden sharp blow or by exerting pressure thereon in any suitable manner. The central prong, in addition to serving as a grip for engaging the ice, also constitutes an anchor for holding the tool in its proper position with respect to the mold, while the shorter prongs 13 engage the ice around the central prong so that when a twisting action is applied to the tool, the gripping head 12 will be held firmly against rotation with respect to the ice mass. The ice block, after being dislodged may be removed by inverting the mold and permitting the block to drop out by gravity, or it may be drawn out with the tool.

In Figs. 5 and 6, the tool is of slightly modified construction and comprises a one piece handle and shank, the handle being indicated at 16 and the shank at 17. This part of the tool may be made of a piece of rod or bar stock bent into the form shown and having its lower end reduced in diameter and projected through a gripping head 18 formed with a series of prongs 19. If desired, the center of the head may be provided with an additional prong made by extending the end of shank 17 and pointing the latter. The head 18 may be made as a separate stamping and welded to the end of shank 17. The end 20 of the shank which projects through the head 18 may be peened over against the latter to insure a firm bond or engagement between the head and shank.

The tool of Figs. 5 and 6 operates in a manner substantially similar to the tool of Figs. 1 to 4, inclusive, the change in structure adapting the tool to individual manufacturing requirements.

In Fig. 7, the tool comprises a handle 21 which is preferably formed with a series of grooves to facilitate a firm grip, a shank 22 which is inserted in, and suitably secured to handle 21 in any convenient manner, and a gripping head 23 formed with prongs 24. The shank 22, head 23 and prongs 24 may constitute a separate piece or integral unit which may be made from steel or other suitable material and assembled in conjunction with handle 21. This tool has the advantage of ruggedness and simplicity but is not as compact as the tools of Figs. 1 to 6, inclusive.

In Fig. 8 a tool of one piece construction is shown compising a handle 25 formed with holes 26 by means of which it may be hung from a nail or other suitable support, a shank 27 and prongs 28 and 29. This tool is of remarkably simple construction and may be made from a piece of flattened steel by a stamping or forging operation. In this instance, the central prong 29 operates to anchor the tool in its gripping action.

In Fig. 9 another form of tool is shown adapted for particular manufacturing requirements and comprising a handle 30, a shank 31 formed with outspread feet or lugs 32, and a gripping head 33 formed with a series of prongs 34. In this instance the handle, shank and head may be made of separate parts and then assembled in proper relation. For example, the shank may be made of a strip of flat metal bent into the desired shape and the feet 32 welded on to the head 33, the latter preferably comprising a sheet metal stamping, although it can be made in any suitable or convenient manner.

In Figs. 10 and 11, a tool particularly adapted for multiple cell molds is illustrated as is also a multiple cell mold. The mold or tray comprises a frame 35 having slots 36 and 37 at opposite ends thereof and a series of rounded or circular mold cavities 38 arranged in alignment longitudinally of the frame. This type of mold has the characteristics of an ordinary baking pan used for baking cup cakes and the like, and in fact a pan of such type is admirably adapted for use as a freezing tray when a tool of the type herein disclosed is available.

The tool in this instance is in the form of an assembly comprising an anchor bar 39 formed with an elongated slot 40 which preferably extends substantially the length of the aligned mold cavities. At its one end the bar 40 is bent downwardly to provide a hook or lug 41 which is adapted to engage in any one of the slots 36 or 37. The tool proper comprises a handle 42, shank 43 and head 44 formed with a central anchoring prong 45 and a series of outer prongs 46. The shank 46 is preferably provided with upper and lower collars 47 and 48 whereby it may be located in the slot 40 and held in slidable position on the bar 39.

The manner in which the tool of Figs. 10 and 11 may be used is clearly illustrated in Fig. 10. The hook-shaped end 41 of the bracket 39 is inserted in one of the slots 36 or 37 and the bracket then brought down over the tray with the tool in proper aligned position with respect to any selected mold, whereupon the bar 39 is held with one hand while the tool is rotated with the other. When not in use, the tool and bracket may be removed and hung or placed in any convenient location.

In Fig. 12 a modified type of tool with respect to that shown in Figs. 10 and 11 is illustrated but in this instance the tool is primarily adapted for single cell molds of the type shown in Figs. 3 and 4. A bracket 49 is provided and has its lower end shaped to engage over the bead 50 of the mold 51. The tool proper is substantially similar to that shown in Figs. 10 and 11 and is given like reference numerals except that a prime has been added. The bracket 49 may be formed with a hole to receive the shank 43', the latter being held in rotative position on the bracket by means of collars 47' and 48'. In using this type of mold, the bracket 49 is engaged with the bead 50 and the tool forced downwardly into the ice block and rotated to dislodge the said block; or the tool may be forcefully engaged with the ice block and the bracket then sprung into engagement with the bead 50.

From the foregoing it will be noted that a remarkably convenient tool for removing ice or other congealed matter from a circular mold is provided. Tools of this type may be made on a low cost production basis and included with merchandise as a novelty or used to advertise certain products, or may be sold in the usual manner as a tool or in combination with an ice tray or mold.

It will be understood that certain changes in construction and design may be adapted without departing from the spirit and scope of the invention as defined in the appended claims.

What is claimed is:

1. In combination with a mold having a rounded or circular mold cavity, a tool for removing frozen or congealed substances from said cavity comprising a hand tool provided with a handle and a shank projecting from said handle and terminating in a head having a plurality of prongs projecting therefrom and adapted to be embedded in the ice mass, and a bracket adapted to detachably engage the mold and hold the tool in operative position with respect to the mold.

2. A tool assembly for dislodging and removing ice blocks from a mold having a rounded or circular mold cavity comprising a bracket adapted to detachably engage the mold, a hand tool provided with a handle and a shank projecting from the said handle and terminated in a head portion having a series of prongs projecting therefrom and adapted to engage the ice mass, and means rotatably mounting said tool in said bracket.

3. A tool assembly for dislodging and removing frozen or congealed matter such as ice blocks from ice molds having one or more cells of rounded or circular contour, comprising a bracket provided with means for detachably engaging said mold, a hand tool having a handle and a shank portion projecting from said handle and terminating in a head having a plurality of prongs projecting therefrom and adapted to engage the ice block, and means slidably and rotatably mounting said tool in said bracket.

4. As an article of manufacture, a hand tool for dislodging and removing ice blocks from a mold having a rounded or circular mold cavity comprising a handle, a shank projecting from said handle and terminating in a head having a central prong projecting therefrom and a plurality of additional prongs spaced radially with respect to said central prong, said handle extending in a plane substantially normal to the shank, and means for detachably connecting the tool to the mold during operation of the tool.

5. As an article of manufacture, a hand tool for dislodging for removal ice blocks from a circular mold cavity and comprising a handle, a shank projecting from said handle and provided with a head having a relatively broad side disposed transversely of said shank providing a relatively large surface for contact with a circular ice block, said head having on its ice block engaging side a relatively sharp central prong disposed in axial alignment with said shank and spaced relatively short sharp prongs around the periphery of said board side of a length not to appreciably penetrate the ice and providing relatively broad engagement with the ice with the relatively short prongs adjacent diametrically opposite edges of said ice engaging face of said head whereby the tool may be gently pressed to bring the head into intimate engagement with the ice to cause the prongs to penetrate the ice without fracturing the same and the tool given a rotary movement to loosen the ice.

LOGAN L. MALLARD.